(12) United States Patent
Merz et al.

(10) Patent No.: US 11,562,361 B2
(45) Date of Patent: Jan. 24, 2023

(54) ENTITY IDENTIFICATION BASED ON A RECORD PATTERN

(71) Applicant: MasterCard International Incorporated, Purchase, NY (US)

(72) Inventors: Christopher John Merz, Wildwood, MO (US); Joshua A. Allbright, Valley Park, MO (US); Adam Kenneth Hosp, Lake St. Louis, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 318 days.

(21) Appl. No.: 15/847,924

(22) Filed: Dec. 20, 2017

(65) Prior Publication Data
US 2019/0188716 A1 Jun. 20, 2019

(51) Int. Cl.
*G06Q 20/40* (2012.01)
*G06Q 40/00* (2012.01)
*G06F 16/35* (2019.01)
*G06F 16/2455* (2019.01)

(52) U.S. Cl.
CPC ... *G06Q 20/4014* (2013.01); *G06F 16/24564* (2019.01); *G06F 16/35* (2019.01); *G06Q 20/4016* (2013.01); *G06Q 40/125* (2013.12)

(58) Field of Classification Search
CPC .......... G06Q 20/4014; G06Q 20/4016; G06Q 40/125; G06F 16/35; G06F 16/24564
USPC ....................................................... 705/75
See application file for complete search history.

(56) References Cited

U.S. PATENT DOCUMENTS

| | | | | |
|---|---|---|---|---|
| 9,367,806 B1* | 6/2016 | Cosic | ..................... | G06N 5/022 |
| 10,262,358 B2* | 4/2019 | Oshry | .................... | G06Q 40/00 |
| 2001/0027472 A1* | 10/2001 | Guan | ..................... | H04W 4/00 |
| | | | | 709/203 |
| 2002/0116615 A1* | 8/2002 | Nguyen | .................. | G07F 17/32 |
| | | | | 713/168 |
| 2003/0225742 A1* | 12/2003 | Tenner | ................... | G06Q 30/02 |
| 2014/0330690 A1* | 11/2014 | Oshry | .................... | G06Q 40/00 |
| | | | | 705/35 |
| 2014/0337205 A1* | 11/2014 | Tavares | ............... | G06Q 20/204 |
| | | | | 705/39 |
| 2015/0178729 A1* | 6/2015 | Kuo | ....................... | G06Q 20/02 |
| | | | | 705/44 |
| 2016/0171075 A1* | 6/2016 | Erenrich | .......... | G06F 16/24558 |
| | | | | 707/738 |
| 2016/0203478 A1* | 7/2016 | Gardiner | ............. | G06Q 20/382 |
| | | | | 705/16 |
| 2017/0293911 A1* | 10/2017 | Vyas | .................. | G06Q 20/3224 |
| 2018/0196694 A1* | 7/2018 | Banerjee | ................ | H04L 67/42 |

* cited by examiner

*Primary Examiner* — Patrick McAtee
*Assistant Examiner* — Zesheng Xiao

(57) ABSTRACT

The methods described herein are configured to obtain a first record pattern associated with the unidentified entity and select a second record pattern associated with an entity identifier of a known entity. Based on the first record pattern matching the second record pattern, the entity identifier of the known entity is associated to the unidentified entity to indicate that the unidentified entity and the known entity are the same. Determining the entity identifier of the unidentified entity enables the linking of separate identifier systems of data structures to facilitate communication and/or interaction between the data structures.

20 Claims, 5 Drawing Sheets

ENTITY IDENTIFICATION BASED ON A RECORD PATTERN

BACKGROUND

Data structures and databases use identifier systems to create identifiers for stored records that uniquely identify the records and/or specific aspects of the records. Entities (e.g., users, companies, service providers, etc.) with which the records are associated also have unique identifiers assigned within the data structures. However, separate data structures use different identifier systems to create and assign identifiers, such that an entity identifier in one data structure does not match with an identifier for the same entity in a different data structure. In some cases, multiple data structures owned and/or managed by different entities store the same or similar records associated with different entity identifiers. It is sometimes necessary for the entities managing the data structures to communicate regarding the stored records, and synchronizing or matching the entity identifiers of the respective records is paramount to clear, effective communication.

Matching and "fuzzy matching" of data associated with the records may be used; data points of the records are compared with other similar known data points to try to identify an overlap. For instance, location data from a social media application may be compared to location data from a record to determine if the social media user matches the customer of the record. In another example, a company name associated with one record may be compared to a company name on another record to determine if the records are associated with the same company. While these techniques can provide accurate matching in some situations, there are many situations where a match between records and/or identifiers cannot be verified or where a false positive match is provided. In the above example, a false positive match may be provided when records associated with two different companies with similar names are matched. Accurate communication between entities with respect to shared records demands accurate, efficient matching and/or synchronizing of entity identifiers between the multiple data structures storing the records.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for identifying an entity based on a record pattern comprises obtaining a first record pattern associated with the unidentified entity and selecting a second record pattern associated with an entity identifier of a known entity. Based on the first record pattern matching the second record pattern, the entity identifier of the known entity is associated to the unidentified entity to indicate that the unidentified entity and the known entity are the same.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

The computing devices and methods described below are configured to accurately and efficiently identify an entity based on records in a data structure and/or match entity identifiers between multiple data structures with separate identifier systems. A record pattern associated with an entity to be identified from a data structure is obtained and compared with a selected record pattern associated with an entity identifier of a known entity from a second data structure. If the two record patterns are found to match, the entity identifier of the known entity is associated with the entity to be identified, indicating that the entity to be identified and the known entity are the same. The use of record patterns to match entity identifiers provides an accurate, simple method of facilitating communication between entities and/or parties with respect to shared records.

In an example, a payment processing network receives, from a facilitator, such as an acquirer, issuer, service provider, etc., a request for data associated with an entity. The request for data includes a record pattern from the facilitator's record data structure associated with the entity. The payment processing network matches the received record pattern against records in the payment processing network's record data structure to identify the entity identifier of the entity. If a match is found, the entity identifier of the entity on the payment processing network's record data structure is provided to the facilitator for association with the entity, to facilitate communication about the entity, and/or to share data associated with the entity.

The use of record pattern matching described herein provides improved accuracy and efficiency in matching entity identifiers across multiple data structures. By matching a sufficient number of records, an accurate match may be verified with greater confidence than the "fuzzy matching" techniques described previously. Using a required record pattern for matching provides entities with a method of initiating the matching process and an efficient process for confirming a match. A computing device or processor may quickly match discrete record data points of separate records with great precision.

This detailed description in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

Figure 1:
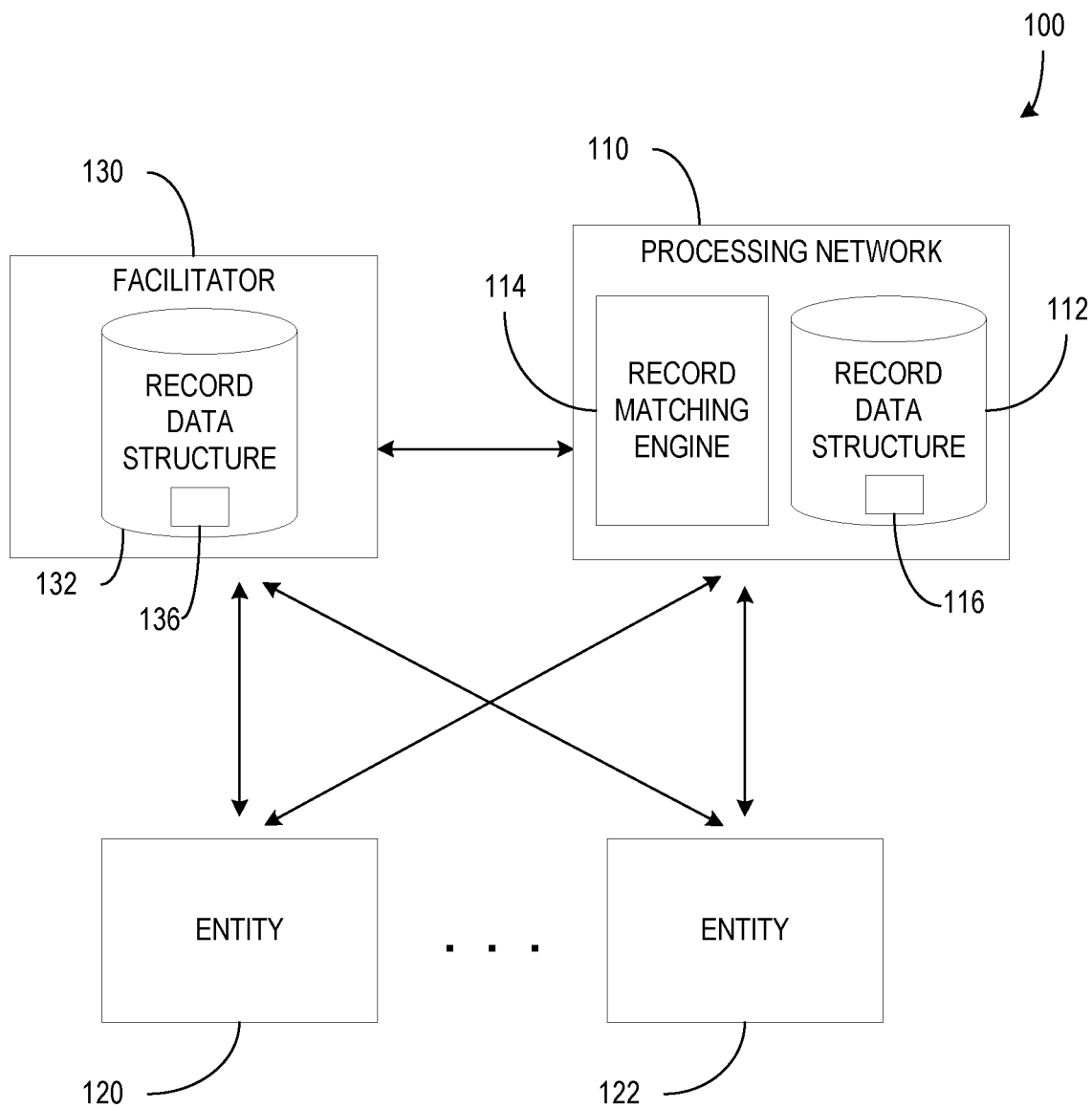
FIG. 1 is an exemplary block diagram illustrating a system for identifying entities based on record patterns according to an embodiment.

FIG. 1 is an exemplary block diagram illustrating a system 100 for identifying entities based on record patterns according to an embodiment. The system 100 includes a processing network 110 and a facilitator 130 (e.g., an issuer, acquirer, bank, service provider, etc.), as well as multiple associated entities 120-122. The processing network 110 and facilitator 130 include record data structures 112 and 132 respectively. Further, the processing network 110 includes a record matching engine 114 that is configured to match record patterns, or record fingerprints, in order to identify entities as described herein.

In some examples, the processing network 110 and facilitator 130 store pools of records associated with one or more entities (e.g., entities 120-122, etc.) in their associated record data structures 112 and 132. The records may store information associated with transactions or other interactions with the entities. A record may include, for instance, a value associated with an interaction, a date and/or time, a day of the week, a location of an interaction, an identifier of a customer or other party to the interaction, cryptograms or other encrypted data associated with the interaction (e.g., credit and/or debit cards with microchips may generate cryptograms that may be used to determine a signature, fingerprint ID, or the like of the user, etc.), and/or other data points associated with the interaction. In an example, a record is associated with a transaction at an entity 120 and the record includes an amount value and a date.

In addition to interaction-based data points, records are associated with entity identifiers in the respective record data structures 112 and 132. The processing network 110 and facilitator 130 may use independent entity identifier systems, such that an entity (e.g., entity 120, entity 122, etc.) is identified by different entity identifiers in the separate record data structures 112 and 132.

The interactions with which the records are associated may be interactions in which both the processing network 110 and the facilitator 130 play a part. For instance, in a monetary transaction, the facilitator 130 may be an acquirer or issuer of credit, while the processing network 110 may be a separate processing entity of the transaction. The interaction may take place at one of the entities 120-122 and each of the processing network 110 and the facilitator 130 may retain separate records of the interaction in the respective record data structures 112 and 132. The entities 120-122 may, for instance, be users, accounts, companies, venues at which customers shop and buy goods and/or services, etc.

In some examples, synchronization of the entity identifiers of the record data structures 112 and 132 may be necessary or desirable. Communication between the processing network 110 and the facilitator 130 about an entity (e.g., entity 120, 122, etc.) is simplified and/or enhanced by confirming that each of the processing network 110 and facilitator 130 are communicating about the same entity by matching respective entity identifiers. For instance, the facilitator 130 may request access to data about the entity that is stored by the processing network 110. The communication between processing network 110 and facilitator 130 may be for linking separate data structures for data analysis, fraud detection and/or prevention, entity information sharing, facilitating software and/or data distribution to entities, or other purposes. The record matching engine 114 may be used by the processing network 110 to synchronize entity identifiers of record data structure 112 with entity identifiers of record data structure 132 as described herein. It should be understood that, while the record matching engine 114 is shown as a part of the processing network 110, in other examples, a record matching engine may be present in or associated with other entities, such as the facilitator 130, without departing from the description herein.

The record matching engine 114 receives or otherwise obtains a record pattern 136 from the record data structure 132 of the facilitator 130. A record pattern (e.g., record patterns 116, 136, etc.) includes a plurality of records that are associated with a single entity identifier of the record data structure in which it is stored. For instance, record pattern 136 may include a plurality of records associated with an entity identifier of entity 120 in the record data structure 132. A record pattern may include all the records associated with an entity, or it may include a subset of the records associated with the entity. The records may be selected randomly or pseudo-randomly, or they may be selected based on defined arrangements, such as records that occurred within a defined recent timeframe. For instance, a record pattern may include a number of records (e.g., 8 records, 9 records, etc.) from within the past day, week, month, etc. In some examples, a record pattern may include a plurality of partial records, such that a subset of data of each record is included in the record pattern. For instance, a record pattern may include anonymized records that include only data points that cannot be used to identify parties associated with the records (e.g., records that include only an amount and a date, rather than an account number, account holder name, etc.).

Alternatively, or additionally, records in a record pattern may be encrypted, hashed, or otherwise transformed using a method known to both parties (e.g., the processing network 110 and the facilitator 130, etc.), such that the transformed records may be matched while enhancing the security of the records in the record patterns as they are transferred, transmitted, etc. For instance, the record patterns may include amount values and dates, such that the amount values and dates may be hashed into key values of the records using a method known by both parties (e.g., processing network 110 and facilitator 130, etc.) and those key values compared when matching the first and second record patterns to each other.

The number of records in a record pattern (e.g., record patterns 116, 136, etc.) may be based on a defined number, or record pattern size, that provides sufficient confidence when matching record patterns. In some examples, the number of matched records required for an accurate matching process is in the range of 8-9 records. Other examples may require more or fewer record matches and/or different record data points to provide accurate matches. The required number of records may be defined based on experimenting on known data sets to find the number of records that provides a sufficient confidence in the accuracy of associated matches. The number of records may further be chosen such that a minimal number of records is required to be sent from facilitators or other entities in order to find a match, as the provision of records is simplified by reducing the number required. So, the defined number of records necessary in a record pattern for a confident match may be the smallest record pattern size that provides sufficient match confidence. This defined number may be shared with facilitators (e.g., facilitator 130, etc.) and/or other entities so that they may provide the processing network 110 with the correct number of records for matching purposes.

The record matching engine 114 may match the record pattern 136 against a record pattern 116 from the record data structure 112 as described below.

Figure 2:
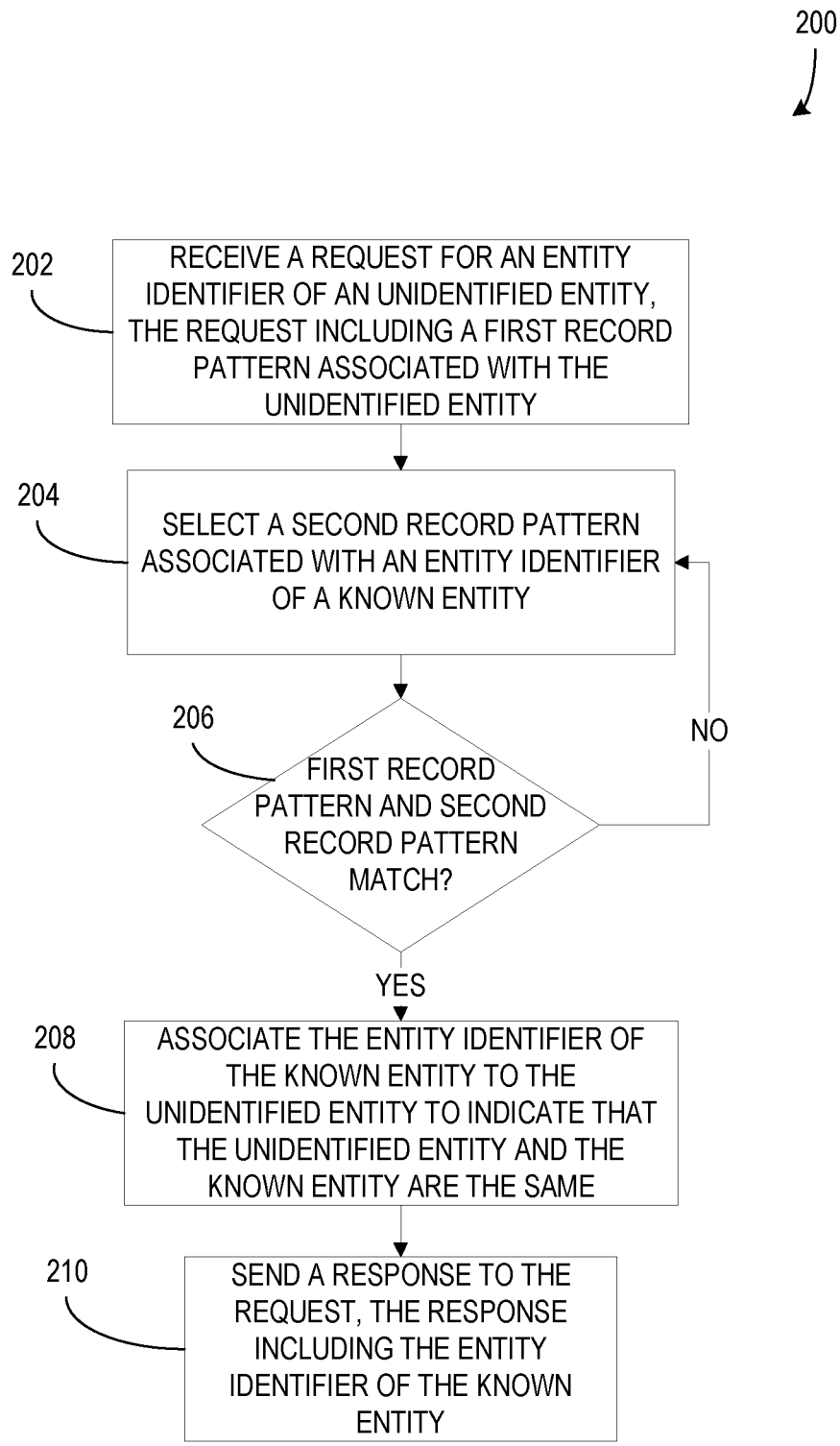
FIG. 2 is an exemplary flow chart illustrating a method of identifying an entity based on a record pattern according to an embodiment.

FIG. 2 is an exemplary flow chart illustrating a method 200 of identifying an entity based on a record pattern according to an embodiment. At 202, a request is received for an entity identifier of an unidentified entity. The request includes a first record pattern associated with the unidentified entity. For instance, the request may be received by the processing network 110 from the facilitator 130. The first record pattern (e.g., record pattern 136, etc.) may be provided to the record matching engine 114. The received first record pattern includes records associated with a single entity, the entity identifier of which the facilitator 130 is requesting from the processing network 110. It should be understood that the facilitator 130 may have a defined entity identifier for the unidentified entity, but the facilitator 130 is requesting the entity identifier that is used by the processing network 110 for that entity.

At 204, a second record pattern associated with an entity identifier of a known entity is selected. The second record pattern may be selected by a record matching engine (e.g., record matching engine 114, etc.). The second record pattern may include all or a subset of the records associated with the entity identifier of the known entity stored in the record data structure of the processing network (e.g., processing network 110, etc.) or other similar entity associated with the record matching engine. The selection of the second record pattern may be based on the associated entity identifier and/or based on data in the second record pattern that matches data in the first record pattern. For instance, selecting the second record pattern may include selecting record patterns in sequence based on the associated entity identifier of the record pattern and testing the selected record patterns until a match is found or the possible record patterns are exhausted. Alternatively, or additionally, possible record patterns for selecting may be identified based on one or more data points that match the first record pattern (e.g., the first record pattern includes a record with a value of 10 on Jan. 1, 2017, so possible record patterns for selected include record patterns that include records with a value of 10 on Jan. 1, 2017, etc.). Combinations of record pattern selection techniques may be used to enhance the efficiency with this the matching entity identifier is determined.

In some examples, there are known entities that are associated with such a quantity of records that matching technique described herein may be ineffective. For instance, a major entity may be associated with such a quantity of records that false-positive matches with the major entity may become common. Such major entities may be ignored for the purpose of matching identifiers as described herein to maintain matching confidence for other entities and reduce multiple and/or inaccurate matches.

When, at 206, the first record pattern and the second record pattern do not match, another second record pattern may be selected at 204. However, when the first record pattern and the second record pattern match at 206, the entity identifier of the known entity is associated to the unidentified entity to indicate that the unidentified entity and the known entity are the same at 208. The matching of the record patterns (e.g., record patterns 116 and 136, etc.) may include matching one or more data points of each record of the record patterns. For instance, matching may be based on matching a value of each record in record pattern 136 to a value of each record in record pattern 116. More than one data point may also be used. In another example, the records of each record pattern are matched based on a value of the record and a date that the record occurred or was created.

If there is only one matching second record pattern, then the associated known entity is a strong match. However, in some examples, record patterns associated with more than one known entity may match the first record pattern. Determining which known entity is a match may require additional information. For instance, additional records for the first record pattern may be requested to narrow the matching known entities down to one known entity. Alternatively, other data points of the records that had not previously been used in the matching may be evaluated. Other details of the known entities (e.g., name, location, other contextual data points, etc.) may be considered as well in narrowing down the matching known entities.

When the first record pattern and second record pattern match, the entity identifiers may be synchronized between the two associated record data structures. Associating the entity identifier of the known entity to the unidentified entity may include storing the relationship between the known entity and the unidentified entity. For instance, the sent request may include an entity identifier that is used by the request sender for the unidentified entity. Once the entity identifier of the known entity and the unidentified entity are associated, the relationship between the entity identifiers may be saved, such that one of the entity identifiers may be mapped to the other during future interaction, communication, etc. between the associated parties (e.g., facilitator 130 and processing network 110, etc.).

At 210, a response to the request is sent (e.g., the processing network 110 sends a response to the facilitator 130, etc.) that includes the entity identifier of the known entity. By sending the entity identifier of the known entity, the recipient of the response may also store or otherwise create the association between the unidentified entity and the known entity. For instance, the facilitator 130 may store the association between the local entity identifier of the unidentified entity and the received entity identifier of the known identity in the record data structure 132 for use during future interactions, communications, etc.

Figure 3:
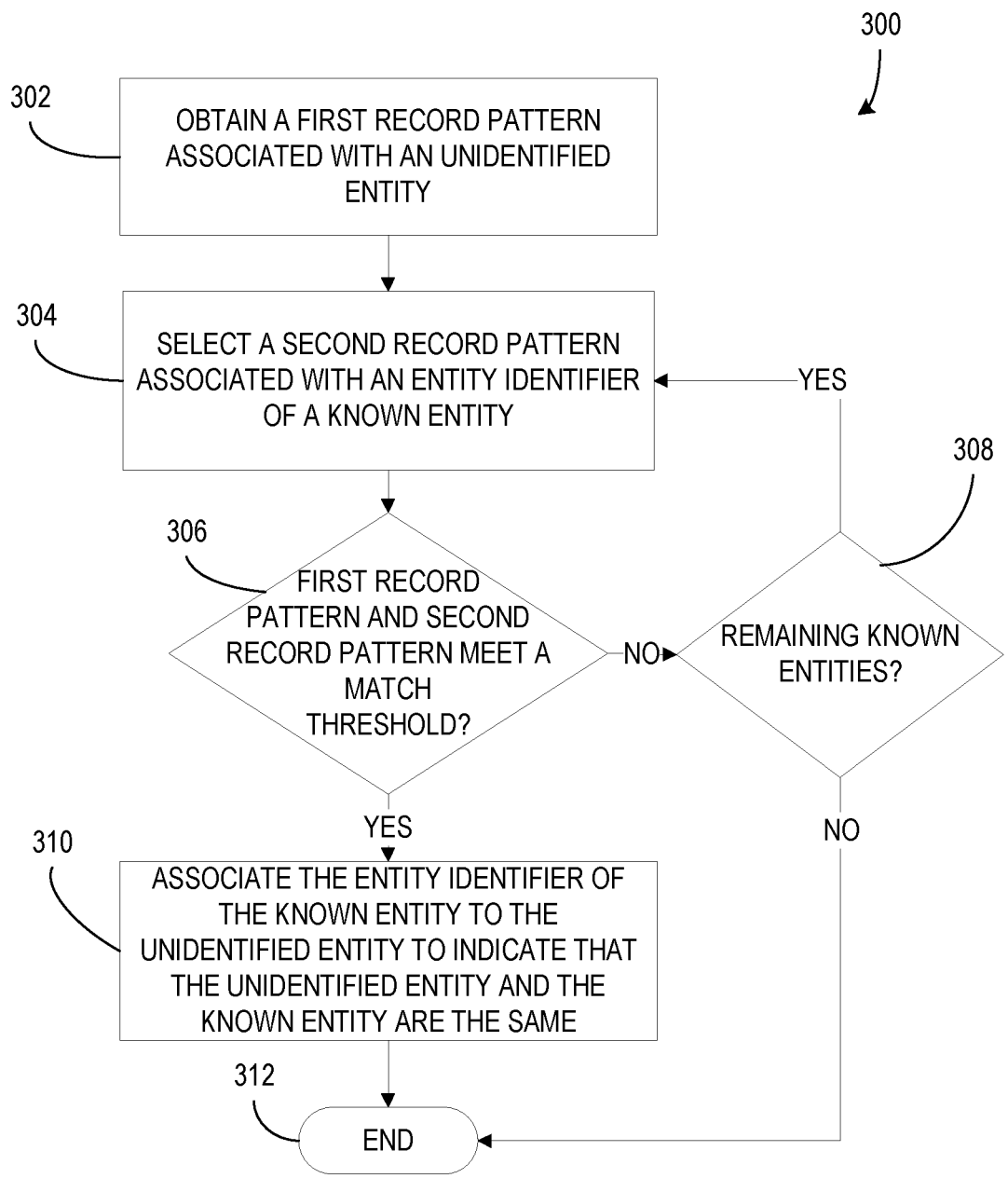
FIG. 3 is an exemplary flow chart illustrating identifying an entity based on a record pattern match threshold according to an embodiment.

FIG. 3 is an exemplary flow chart illustrating a method 300 of identifying an entity based on a record pattern match threshold according to an embodiment. At 302, a first record pattern associated with an unidentified entity is obtained. The record pattern may be obtained via receiving it, as described above with respect to FIG. 2. Alternatively, the record pattern may be obtained by requesting it from a facilitator (e.g., facilitator 130, etc.) or otherwise retrieving it from a different source, accessing it from a data structure, etc.

At 304, a second record pattern associated with an entity identifier of a known entity is selected as described above with respect to 204. At 306, the first record pattern and second record pattern are compared to determine if they meet a defined match threshold. The match threshold indicates a degree to which the record patterns must match in order to be accepted as "matching" at a required confidence level. In some examples, the match threshold may be a number of records that match, or a percentage of records that match, etc. For instance, the match threshold may be defined as 8 or 9 records in the first record pattern are matched in the second record pattern, or the match threshold may be defined as 90% of the records in the first record pattern are matched in the second record pattern.

The match threshold may vary based on aspects of the record patterns. For instance, if the match threshold is a percentage match, the match threshold may be lower when more records are being matches. In an example, the match threshold for record patterns that include 10 or fewer records may be high (e.g., 95%, 100%, etc.) and/or the match threshold for record patterns that include 20 or more records may be lower (e.g., 75%, 80%, etc.). The variance in the match threshold reflects a degree of confidence in the match between the two record patterns. It may be determined that a number of matching records provides a high confidence level of a match for the entity or type of entity being matched, such that, once the number of matching records is reached, the match between the two record patterns is confirmed. In some examples, matching records in the range of 8 or 9 records provides sufficient confidence to confirm and trust that the record patterns match.

Different types of entities may require more or fewer matching records to provide a sufficiently confident match between record patterns. For instance, the entities to be matched may have records of many similar-value interactions, making false matches more likely. In this case, the match threshold may be higher in order to ensure an accurate match, or the required match threshold may be set lower to ensure a match can be found, with the understanding that incorrect matches will be more common. Alternatively, the entities may have few or infrequent records. In this case, fewer matching records may be required, but additional data points for each record may be used during the matching process to ensure an accurate match.

In some examples, in addition to matching data points of records in the record pattern, a name or other string-based identifier of the unidentified entity may be matched against an equivalent identifier of the known entity. For instance, the unidentified entity may have a name of "Entity A" and the known entity may have a name of "Entity A, Inc.". In some cases, the string-based identifiers may match exactly, providing additional confidence to the matching process. However, in other cases, the string-based identifiers may not match exactly, as shown in the above example. Partial matching, or "fuzzy matching", of string-based identifiers may be used in conjunction with the matching of the record patterns in order to increase the confidence level of a match of the unidentified entity with the known entity, even in the absence of an exact match.

If the first record pattern and the second record pattern do not meet the match threshold at 306, remaining known entities that have not been compared to the first record pattern are identified at 308. If there are remaining known entities, a second record pattern associated with one of the remaining known entities is selected at 304. If there are no remaining know entities to compare to the first record pattern a 308, the process ends at 312. If no matching known entity is found, a notification may be provided that instructs parties (e.g., facilitator 130, processing network 110, etc.) that a match could not be found.

In some examples, if no matching record pattern is found for the first record pattern, the match threshold may be adjusted down and the matching may be attempted again. If a match is found after adjusting the threshold down, then it would be noted that the match has a lower confidence level than it otherwise would have. The matched entity identifier may still be useful, even with a lower confidence value (e.g., weaker matches may indicate different relationships between entities, such as entities that are of the same type or chain, entities that are near each other, etc.). In this way, the closest match to the first record pattern may be found and used with an appropriate level of trust based on the strength of the match, even if the match is not as strong as required by the initial match threshold.

If the first record pattern and the second record pattern meet the match threshold at 306, the entity identifier of the known entity is associated to the unidentified entity at 310, as described above with respect to 208. Then, the process ends at 312.

Figure 4:
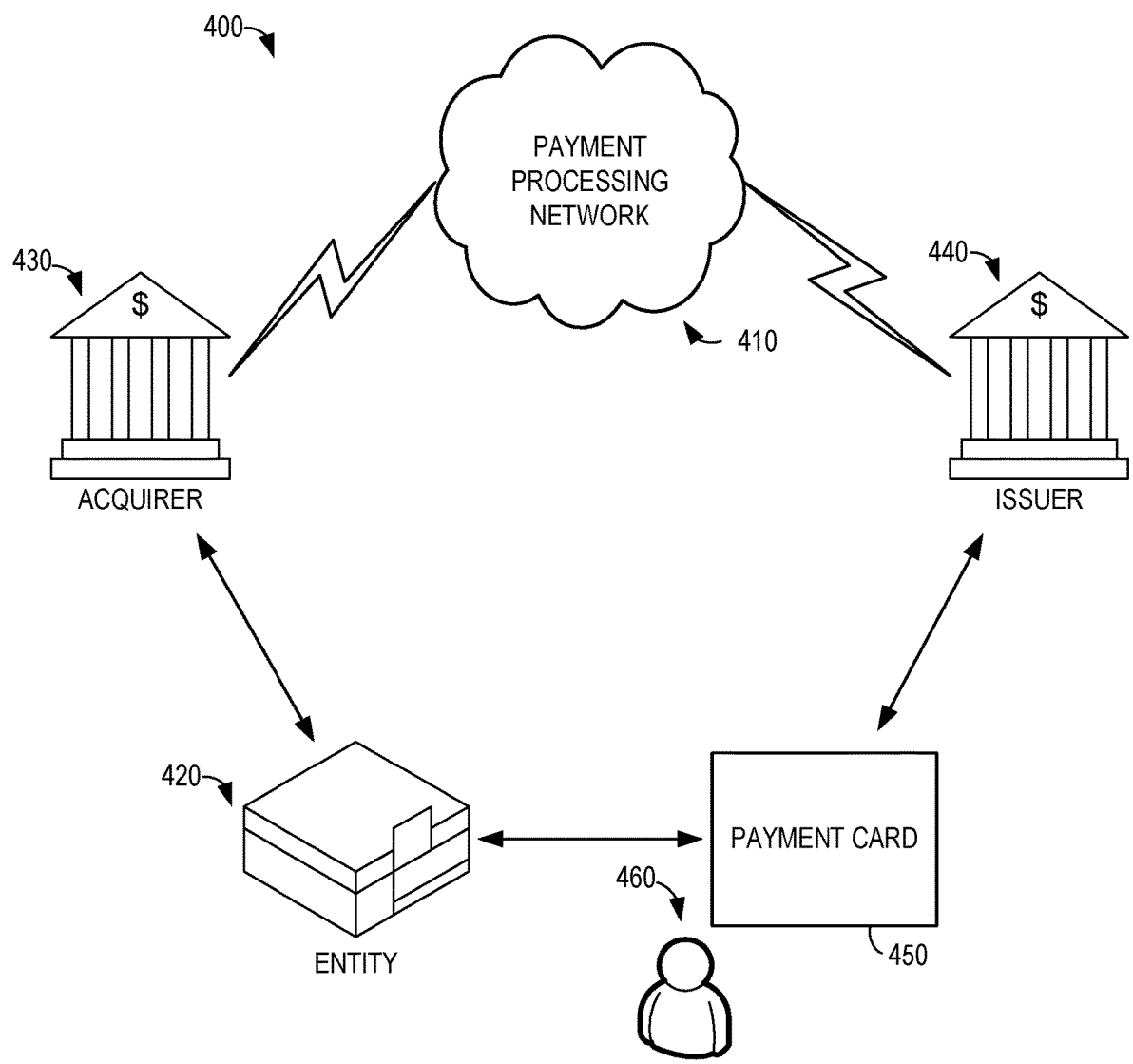
FIG. 4 is a block diagram illustrating an example environment for processing one or more financial transactions.

FIG. 4 is a block diagram illustrating an example environment 400 for processing one or more financial transactions. The processing network 110 (shown in FIG. 1), for example, may process one or more financial transactions in the environment 400. The environment 400 includes a processing network 410, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 400 includes one or more entities 420 (e.g., merchants, etc.) that accept payment via the processing network 410. For example, payment may be accepted at a client device, such as a point-of-sale (POS) terminal, etc. To accept payment via the processing network 410, the entity 420 establishes a financial account with an acquirer 430 that is a member of the processing network 410. The acquirer 430 is a financial institution that maintains a relationship with one or more entities 420 to enable the entities 420 to accept payment via the processing network 410. The acquirer 430 may also be known as an acquiring bank, or a processing bank.

The environment 400 includes one or more issuers 440 that issue or provide payment cards 450 (e.g., credit card, debit card, prepaid card, and the like) or other payment products to one or more users 460 (e.g., cardholders, account holders, etc.). The issuer 440 is a financial institution that maintains a relationship with one or more users 460 to enable the users 460 to make a payment using the payment card 450 via the processing network 410.

A user 460 uses a payment product, such as a payment card 450, to purchase a good or service from an entity 420. In some embodiments, the payment card 450 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 450 to purchase a good or service from an entity 420. (BLUETOOTH® is a registered trademark of Bluetooth Special Interest Group, ZIGBEE® is a registered trademark of the ZigBee Alliance, and WI-FI® is a registered trademark of the Wi-Fi Alliance). The user 460 may use any payment product that is linked or associated with a corresponding financial account maintained by an issuer 440. As described herein, the term "payment card" includes credit cards, debit cards, prepaid cards, digital cards, smart cards, and any other payment product that is linked or associated with a corresponding financial account maintained by an issuer 440. Payment cards 450 may have any shape, size, or configuration that enables the environment 400 to function as described herein.

A user 460 may present the entity 420 with a payment card 450 to make a payment to the entity 420 in exchange for a good or service. Alternatively, the user 460 may provide the entity 420 with account information associated with the payment card 450 without physically presenting the payment card 450 (e.g., for remote financial transactions including e-commerce transactions, card-not-present transactions, or card-on-file transactions). Account information may include a name of the user 460, an account number, a card number, an expiration date, and/or a security code (such as a card verification value (CVV), a card verification code (CVC), and the like).

The entity 420 requests authorization from an acquirer 430 for at least the amount of the purchase. The entity 420 may request authorization using any financial transaction computing device configured to transmit account information of the user 460 to one or more financial transaction processing computing devices of the acquirer 430. For example, the entity 420 may request authorization through a point-of-sale (POS) terminal, which reads account information of the user 460 from a microchip or magnetic stripe on the payment card 450, and transmits the user's account information to the one or more financial transaction processing computing devices of the acquirer 430. For another example, the POS terminal reads account information of the user 460 from a device configured to communicate with the POS terminal using contactless payment technology, and transmits the user's account information to one or more financial transaction processing computing devices of the acquirer 430.

Using the processing network 410, the financial transaction processing computing devices of the acquirer 430 communicate with one or more financial transaction processing computing devices of an issuer 440 to determine whether the account information of the user 460 matches or corresponds to the account information of the issuer 440, whether the account is in good standing, and/or whether the purchase is covered by (e.g., less than) a credit line or account balance associated with the financial account. Based on these determinations, the financial transaction processing computing devices of the issuer 440 determine whether to approve or decline the request for authorization from the entity 420.

If the request for authorization is declined, the entity 420 is notified as such, and may request authorization from the acquirer 430 for a lesser amount or request an alternative form of payment from the user 460. If the request for authorization is approved, an authorization code is issued to the entity 420, and the user's available credit line or account balance is decreased. The financial transaction is then settled between the entity 420, the acquirer 430, the issuer 440, and/or the user 460. Settlement typically includes the acquirer 430 reimbursing the entity 420 for selling the good or service, and the issuer 440 reimbursing the acquirer 430 for reimbursing the entity 420. When a credit card is used, the issuer 440 may bill the user 460 to settle a financial account associated with the user 460. When a debit or prepaid card is used, the issuer 440 may automatically withdraw funds from the account.

Through the above described interactions in the environment 400, records of transactions may be stored in record data structures (e.g., record data structures 112, 132, etc.) by the payment processing network 410, the acquirer 430, and/or the issuer 440, etc. The transaction records may include information associated with the transaction, such as the amount, date, and/or time of the transaction, information associated with the entity 420, such as a name of the entity 420, and/or information associated with the payment card 450 and user 460, such as an account number of the payment card 450, a CVV of the payment card 450, and/or a name of the user 460.

Each of the payment processing network 410, acquirer 430, and issuer 440 may associated stored transaction records with an associated entity identifier that is unique to their respective record data structures. These unique entity identifiers may be synchronized or matched using the entity identification systems and methods described herein. For instance, the payment processing network 410 may include a record matching engine (e.g., record matching engine 114, etc.) that is configured to receive record patterns from either the acquirer 430 or the issuer 440 and determine a entity identifier from the record data structure of the payment processing network 410 that matches the received record patterns. The identified entity identifier may then be stored and/or shared in order to facilitate future interactions associated with the identified entity.

Additional Example Scenarios

Aspects of the disclosure enable various additional scenarios, such as next described.

In an example, a payment processing network needs to contact a customer of an issuer. The payment processing network does not have the contact information for the customer, but the issuer does. The payment processing network provides a record pattern of 8 records associated with the customer from the payment processing network's record data structure to the issuer and requests contact information of the associated customer. The issuer compares the provided record pattern to record patterns in the issuer's record data structure. If a customer that matches the provided record pattern is identified, the issuer provides the requested contact information to the payment processing network.

In another example, a software company needs to distribute software to a customer company through a software distribution platform. The software company sends an instruction to the software distribution platform to distribute the software to the customer company. The instruction includes a record pattern that is associated with previous interactions with the customer company. The software distribution platform matches the received record pattern to records in the software distribution platform's record data structure. If a matching customer company is identified, the software distribution platform distributes the software thereto. Further, the software distribution platform may confirm that the software was distributed and provide an identifier of the matched customer company to the software company for future use with respect to the matched customer company. Alternatively, or additionally, if the software installed at the customer company needs to access data at the software company, the same record pattern and/or customer company identifier may be provided as a form of verification of the identity of the customer company.

In another example, a payment processing network detects potentially fraudulent activity associated with an entity. The payment processing network does not have direct contact with the entity, but an acquirer does. The payment processing network may send a fraud notification to the acquirer including a record pattern including records associated with the entity. The acquirer receives the fraud notification and matches the record pattern to verify the entity identifier of the entity in the acquirer's record data structure. When the entity identifier is verified, the acquirer may contact the entity to notify them of the potentially fraudulent activity and/or communicate with the payment processing network further with respect to the fraudulent activity. The verified entity identifier may be shared to the payment processing network by the acquirer to facilitate further communication pertaining to the entity.

In another example, a data analysis division analyzes record data to create insights that may be used to inform business decisions by the company and/or related companies. The company wants to make use of data records from multiple record data structures within a company or other companies. The data analysis division may request verification that the correct records are being analyzed from the multiple record data structures. The request may include record patterns associated with the company or companies that are to be analyzed. The record patterns are then matched against records of the associated record data structures and identifiers associated with the companies are identified based on the matches. The identified identifiers may then be used within the record data structures to ensure that accurate record data is used by the data analysis division during the data analysis process.

Exemplary Operating Environment

Figure 5:
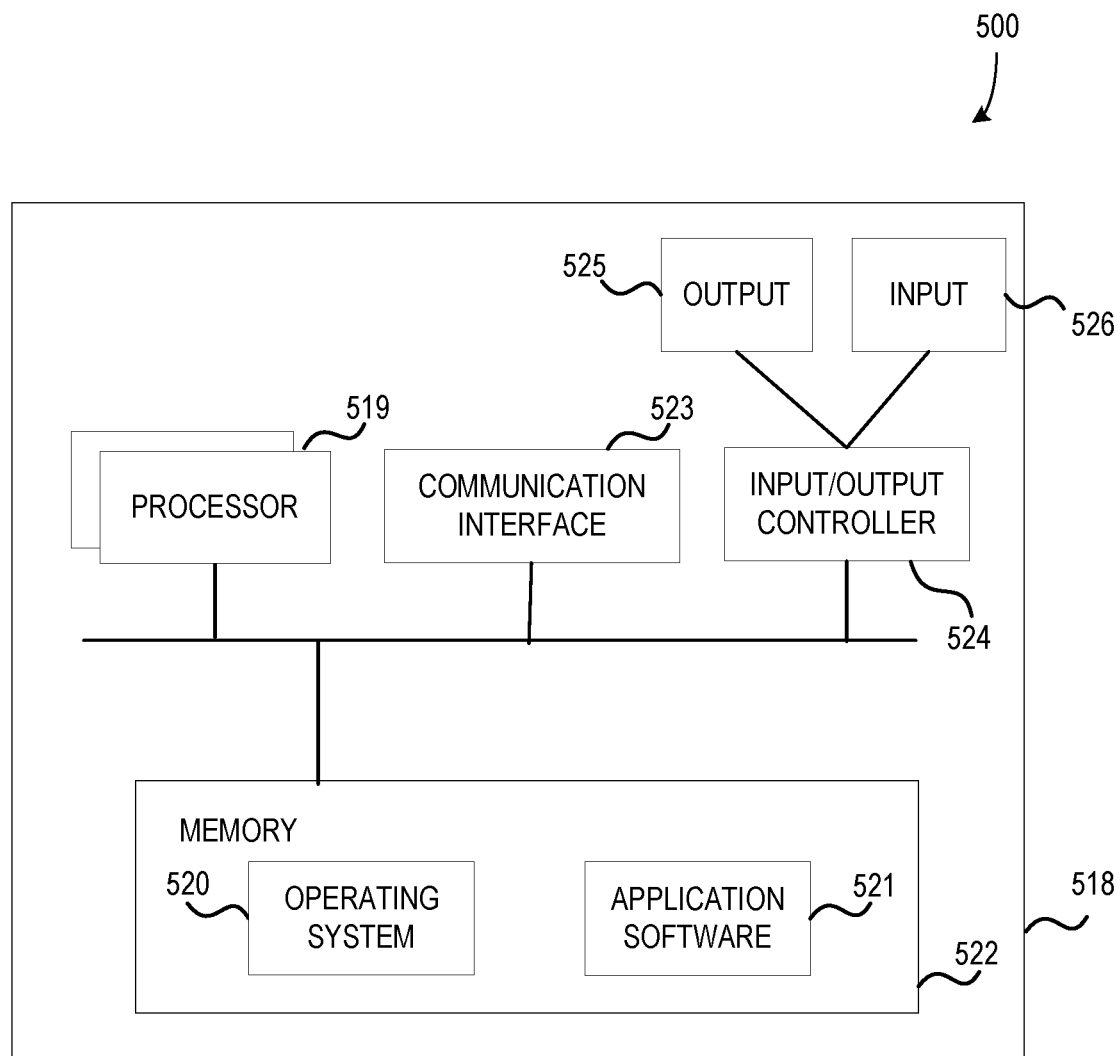
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, identifying entity identifiers based on matching record patterns may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for identifying an entity based on a record pattern comprising:
  at least one processor; and
  at least one memory comprising computer program code, the at least one memory and the computer program code configured to, with the at least one processor, cause the at least one processor to:
  receive a request for an entity identifier of an unidentified entity, the request including a first record pattern associated with the unidentified entity;
  select a second record pattern associated with an entity identifier of a known entity; based on the first record pattern matching the second record pattern, associate the entity identifier of the known entity to the unidentified entity to indicate that the unidentified entity and the known entity are the same; and
  send a response to the request, the response including the entity identifier of the known entity.

The system described above, wherein the first record pattern includes a defined number of records, the records including one or more data points; and
  wherein matching the first record pattern and the second record pattern includes matching the records of the first record pattern with records of the second record pattern based on the one or more data points of the first record pattern.

The system described above, wherein the records of the first record pattern and the records of the second record pattern are transaction records including amount values and dates; and
  wherein matching the first record pattern and the second record pattern includes matching amount values and dates of the records of the first record pattern with amount values and dates of the records of the second record pattern.

The system described above, wherein matching the first record pattern and the second record pattern is based on a defined match threshold, the match threshold requiring that a number of records between the first and second record patterns match or a percentage of records between the first and second record patterns match.

The system described above, wherein the match threshold is lowered when a match is not found for the first record pattern and the matching is retried based on the lowered match threshold.

The system described above, wherein selecting a second record pattern associated with an entity identifier of a known entity includes selecting a known entity based on a data point of a record of the known entity matching a data point of a record of the first record pattern.

The system described above, wherein the data point of the record of the known entity that matches the data point of the record of the first record pattern is a date of the record of the known entity.

The system described above, further comprising requesting additional records for the first record pattern when record patterns associated with entity identities of multiple known entities match the first record pattern.

The system described above, wherein records of the first and second record patterns are hashed to key values and the key values are compared when matching the first and second record patterns.

A computerized method for identifying an entity based on a record pattern comprising:
  obtaining a first record pattern associated with an unidentified entity;
  selecting a second record pattern associated with an entity identifier of a known entity; and
  based on the first record pattern matching the second record pattern, associating the entity identifier of the known entity to the unidentified entity to indicate that the unidentified entity and the known entity are the same.

The computerized method described above, wherein the first record pattern includes a defined number of records, the records including one or more data points; and
  wherein matching the first record pattern and the second record pattern includes matching the records of the first record pattern with records of the second record pattern based on the one or more data points of the first record pattern.

The computerized method described above, wherein the records of the first record pattern and the records of the second record pattern are transaction records including amount values and dates; and
  wherein matching the first record pattern and the second record pattern includes matching amount values and dates of the records of the first record pattern with amount values and dates of the records of the second record pattern.

The computerized method described above, wherein matching the first record pattern and the second record pattern is based on a defined match threshold, the match threshold requiring that a number of records between the first and second record patterns match or a percentage of records between the first and second record patterns match.

The computerized method described above, wherein the match threshold is lowered when a match is not found for the first record pattern and the matching is retried based on the lowered match threshold.

The computerized method described above, wherein selecting a second record pattern associated with an entity identifier of a known entity includes selecting a known entity based on a data point of a record of the known entity matching a data point of a record of the first record pattern.

The computerized method described above, the data point of the record of the known entity that matches the data point of the record of the first record pattern is a date of the record of the known entity.

The computerized method described above, further comprising requesting additional records for the first record pattern when record patterns associated with entity identities of multiple known entities match the first record pattern.

The computerized method described above, wherein records of the first and second record patterns are hashed to key values and the key values are compared when matching the first and second record patterns.

One or more computer storage media having computer-executable instructions for identifying an entity based on a transaction pattern that, upon execution by a processor, cause the processor to at least:
    receive a request for an entity identifier of an unidentified entity, the request including a first transaction pattern associated with the unidentified entity;
    select a second transaction pattern associated with a entity identifier of a known entity;
    based on the first transaction pattern matching the second transaction pattern, associate the entity identifier of the known entity to the unidentified entity to indicate that the unidentified entity and the known entity are the same; and
    send a response to the request, the response including the entity identifier of the known entity.

The one or more computer storage media described above, wherein the first transaction pattern includes a defined number of transactions, the transactions including amount values and dates; and
    wherein matching the first transaction pattern and the second transaction pattern includes matching the transactions of the first transaction pattern with transactions of the second transaction pattern based on the amount values and dates of the transactions of the first record pattern.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for identifying an entity identifier based on matching record patterns. The illustrated one or more processors 519 together with the computer program code stored in memory 522 constitute exemplary processing means for matching record patterns in order to identify and/or synchronize associated entity identifiers.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computing system for identifying an entity based on a record pattern comprising:
    at least one processor; and
    at least one memory comprising computer program code, the at least one memory and the computer program code configured to, with the at least one processor, cause the at least one processor to:
        provide, by a computing device associated with a processing network to a facilitator computing device, a count of records to be sent by the facilitator computing device to the computing device associated with the processing network, the count of records providing a confidence level for matching record patterns;
        receive, by the computing device associated with the processing network from the facilitator computing device, a request with a first record pattern including a plurality of anonymized records, wherein the request is to identify a first entity identifier of an unidentified entity associated with the first record pattern, a quantity of the plurality of anonymized records matching the count, the plurality of anonymized records in the first record pattern including only data points that do not include a customer identifier or a merchant identifier associated with the plurality of anonymized records in the first record pattern, wherein the data points in the plurality of anonymized records include only amount values or dates or both;
        select, from the at least one memory, a second record pattern associated with a second entity identifier of a known entity, the second record pattern including a plurality of records associated with the known entity, wherein the plurality of records in the second record pattern includes the second entity identifier of the known entity along with amount values or dates or both;
        match the first record pattern with the second record pattern, the matching including matching the amount values or dates, or both, of the data points of the plurality of anonymized records in the first record pattern with data points of the plurality of records in the second record pattern;

based on a quantity of the data points of the plurality of anonymized records in the first record pattern matching the data points of the plurality of records in the second record pattern, determine the confidence level for the matching;

fuzzy match the first entity identifier of the unidentified entity with the second entity identifier of the known entity to increase the determined confidence level, the first entity identifier to be identified being received within the request; and based on the increased confidence level, associate the second entity identifier of the known entity to the unidentified entity to indicate that the unidentified entity and the known entity are the same.

2. The computing system of claim 1, wherein matching the first record pattern and the second record pattern includes record patterns associated with more than one known entity in the second record pattern matching the first record pattern, and requesting additional records of the first record pattern to narrow matching known entities down to one known entity.

3. The computing system of claim 1,
wherein matching the first record pattern and the second record pattern includes matching the amount values or dates or both of the anonymized records of the first record pattern with the amount values or dates or both of the records of the second record pattern.

4. The computing system of claim 1, wherein matching the first record pattern and the second record pattern is based on a defined match threshold, the defined match threshold requiring that a number of records between the first and second record patterns match or a percentage of records between the first and second record patterns match.

5. The computing system of claim 4, wherein the defined match threshold is lowered when a match is not found for the first record pattern and the matching is retried based on the lowered match threshold.

6. The computing system of claim 1, wherein selecting the second record pattern associated with the second entity identifier of the known entity includes selecting the known entity based on a data point of a record of the known entity matching a data point of a record of the first record pattern, the first record pattern including a single entity in the plurality of anonymized records associated with the first entity identifier of the unidentified entity.

7. The computing system of claim 6, wherein the data point of the record of the known entity that matches the data point of the record of the first record pattern is a date of the record of the known entity.

8. The computing system of claim 1, wherein the computing device associated with the processing network is a software distribution platform associated with a software company and the facilitator computing device is a computing device associated with a customer company, wherein the computer program code causes the at least one processor associated with the software distribution platform to distribute a software to the customer company by identifying the customer company.

9. The computing system of claim 1, wherein the computing device associated with the processing network is a computing device associated with an issuer and the facilitator computing device is a computing device associated with a payment processing network, wherein the computer program code causes the at least one processor associated with the computing device associated with the issuer to:

identify a contact of a customer associated with the first record pattern; and provide the identified contact to the computing device associated with the payment processing network.

10. A computerized method for identifying an entity based on a record pattern comprising:

providing, by a computing device associated with a processing network to a facilitator computing device, a count of records to be sent by the facilitator computing device to the computing device associated with the processing network, the count of records providing a confidence level for matching record patterns;

obtaining, by the computing device associated with the processing network from the facilitator computing device, a request with a first record pattern including a plurality of anonymized records, wherein the request is to identify a first entity identifier of an unidentified entity associated with the first record pattern, a quantity of the plurality of anonymized records matching the count, the plurality of anonymized records in the first record pattern including only data points that do not include a customer identifier or a merchant identifier associated with the plurality of anonymized records in the first record pattern, wherein the data points in the plurality of anonymized records include only amount values or dates or both;

selecting a second record pattern associated with a second entity identifier of a known entity, the second record pattern including a plurality of records associated with the known entity, wherein the plurality of records in the second record pattern includes the second entity identifier of the known entity along with amount values or dates or both;

matching the first record pattern with the second record pattern, the matching including matching the amount values or dates, or both, of the data points of the plurality of anonymized records in the first record pattern with data points of the plurality of records in the second record pattern based on a quantity of the data points of the plurality of anonymized records in the first record pattern matching the data points of the plurality of records in the second record pattern, determining the confidence level for the matching;

fuzzy matching the first entity identifier of the unidentified entity with the second entity identifier of the known entity to increase the determined confidence level, the first entity identifier to be identified being received within the request; and associating the second entity identifier of the known entity to the unidentified entity to indicate that the unidentified entity and the known entity are the same based on the increased confidence level.

11. The computerized method of claim 10,
wherein matching the first record pattern and the second record pattern includes record patterns associated with more than one known entity in the second record pattern matching the first record pattern, and requesting additional records of the first record pattern to narrow matching known entities down to one known entity.

12. The computerized method of claim 10,
wherein matching the first record pattern and the second record pattern includes matching the amount values or dates or both of the anonymized records of the first record pattern with the amount values or dates or both of the records of the second record pattern.

13. The computerized method of claim 10, wherein matching the first record pattern and the second record pattern is based on a defined match threshold, the defined match threshold requiring that a number of records between the first and second record patterns match or a percentage of records between the first and second record patterns match.

14. The computerized method of claim 13, wherein the defined match threshold is lowered when a match is not found for the first record pattern and the matching is retried based on the lowered match threshold.

15. The computerized method of claim 10, wherein selecting the second record pattern associated with the second entity identifier of the known entity includes selecting the known entity based on a data point of a record of the known entity matching a data point of a record of the first record pattern.

16. The computerized method of claim 15, the data point of the record of the known entity that matches the data point of the record of the first record pattern is a date of the record of the known entity.

17. The computerized method of claim 10, further comprising sending a response to the request, the response including the second entity identifier of the known entity, wherein the facilitator computing device creates an association between the first entity identifier of the unidentified entity and the second entity identifier of the known entity.

18. The computerized method of claim 10, wherein records of the first and second record patterns are hashed to key values and the key values are compared when matching the first and second record patterns.

19. One or more computer storage media having computer-executable instructions for identifying an entity based on a transaction pattern that, upon execution by a processor, cause the processor to at least:
provide, by a computing device associated with a processing network to a facilitator computing device, a count of records to be sent by the facilitator computing device to the computing device associated with the processing network, the count of records providing a confidence level for matching record patterns;
receive, by the computing device associated with the processing network from the facilitator computing device, a request with a first record pattern including a plurality of anonymized records, wherein the request is to identify a first entity identifier of an unidentified entity associated with the first record pattern, a quantity of the plurality of anonymized records matching the count, the plurality of anonymized records in the first record pattern including only data points that do not include a customer identifier or a merchant identifier associated with the plurality of anonymized records in the first record pattern, wherein the data points in the plurality of anonymized records include only amount values or dates or both;
select a second record pattern associated with a second entity identifier of a known entity, the second record pattern including a plurality of records associated with the known entity, wherein the plurality of records in the second record pattern includes the second entity identifier of the known entity along with amount values or dates or both;
match the first record pattern with the second record pattern, the matching including matching the amount values or dates, or both, of the data points of the plurality of anonymized records in the first record pattern with data points of the plurality of records in the second record pattern;
based on a quantity of the data points of the plurality of anonymized records in the first record pattern matching the data points of the plurality of records in the second record pattern, determine the confidence level for the matching;
fuzzy match the first entity identifier of the unidentified entity with the second entity identifier of the known entity to increase the determined confidence level, the first entity identifier to be identified being received within the request; and
based on the increased confidence level, associate the second entity identifier of the known entity to the unidentified entity to indicate that the unidentified entity and the known entity are the same.

20. The one or more computer storage media of claim 19, wherein matching the first record pattern and the second record pattern includes record patterns associated with more than one known entity in the second record pattern matching the first record pattern, and requesting additional records of the first record pattern to narrow matching known entities down to one known entity.

* * * * *